United States Patent [19]

Watanabe et al.

[11] Patent Number: 4,631,556

[45] Date of Patent: Dec. 23, 1986

[54] LIQUID JET RECORDING APPARATUS

[75] Inventors: Yoshitaka Watanabe, Tokyo; Takashi Endo, Machida, both of Japan

[73] Assignee: Canon Kabushiki Kaisha, Tokyo, Japan

[21] Appl. No.: 607,656

[22] Filed: May 7, 1984

[30] Foreign Application Priority Data

| | | | |
|---|---|---|---|
| May 11, 1983 | [JP] | Japan | 58-82351 |
| May 11, 1983 | [JP] | Japan | 58-82352 |
| May 11, 1983 | [JP] | Japan | 58-82354 |
| May 16, 1983 | [JP] | Japan | 58-85206 |
| May 16, 1983 | [JP] | Japan | 58-85207 |

[51] Int. Cl.⁴ .......... G01D 15/18

[52] U.S. Cl. .......... 346/140 R

[58] Field of Search .......... 346/140 R, 75

[56] References Cited

U.S. PATENT DOCUMENTS

| | | | |
|---|---|---|---|
| 3,961,337 | 6/1976 | Jung | 346/140 |
| 4,178,595 | 12/1979 | Jinnai | 346/140 R |
| 4,187,511 | 2/1980 | Robinson | 346/140 R |
| 4,383,263 | 5/1983 | Ozawa | 346/140 |
| 4,394,669 | 7/1983 | Ozawa | 346/140 |

*Primary Examiner*—Joseph W. Hartary
*Attorney, Agent, or Firm*—Fitzpatrick, Cella, Harper & Scinto

[57] ABSTRACT

Liquid jet recording apparatus, in particular, for use in ink-jet recording apparatus. The liquid jet recording apparatus comprises recording liquid storing chambers of large and small capacities. Upon pressurizing, the liquid is supplied from the chamber of large capacity to that of small capacity and discharged from a point of a jet head.

24 Claims, 7 Drawing Figures

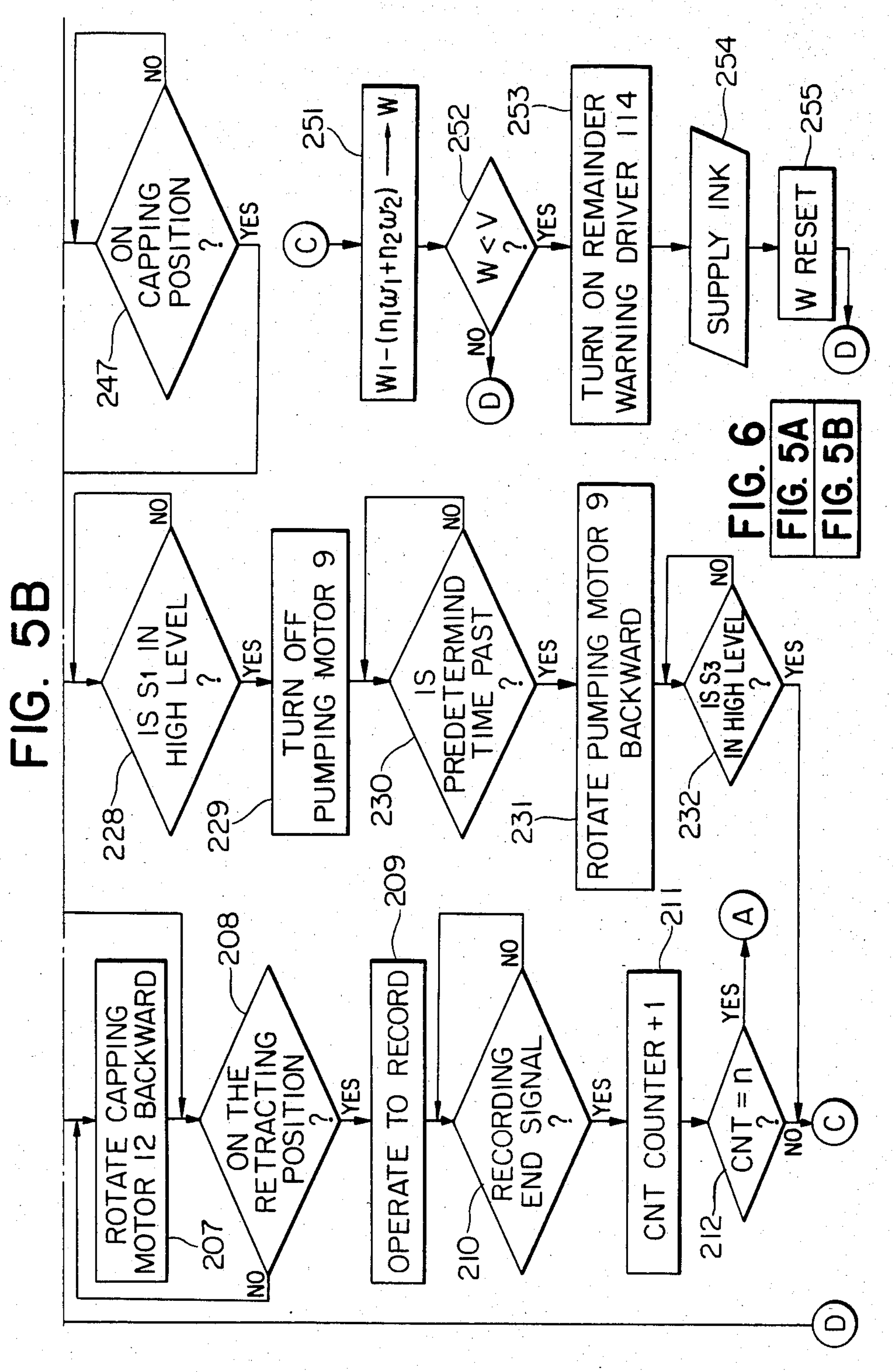
FIG. 5B
ROTATE CAPPING MOTOR 12 BACKWARD
207
ON THE RETRACTING POSITION ?
208
YES
NO
OPERATE TO RECORD
209
RECORDING END SIGNAL ?
210
YES
NO
CNT COUNTER +1
211
CNT = n ?
212
YES
NO
A
C
D
IS S1 IN HIGH LEVEL ?
228
YES
NO
TURN OFF PUMPING MOTOR 9
229
IS PREDETERMIND TIME PAST ?
230
YES
NO
ROTATE PUMPING MOTOR 9 BACKWARD
231
IS S3 IN HIGH LEVEL ?
232
YES
NO
ON CAPPING POSITION ?
247
YES
NO
C
W1-(n1ω1+n2ω2) ⟶ W
251
W < V ?
252
YES
NO
D
TURN ON REMAINDER WARNING DRIVER 114
253
SUPPLY INK
254
W RESET
255
D
FIG. 6
FIG. 5A
FIG. 5B

LIQUID JET RECORDING APPARATUS

BACKGROUND OF THE INVENTION

1. Field of the Invention

The present invention relates to a liquid jet recording apparatus such an ink-jet recording apparatus or the like.

2. Description of the Prior Art

Ink-jet recording apparatuses are being highlighted as a new recording technology since they have advantages such that the direct recording is possible and the color recording is easy and that the noise is so low to be ignored, etc. In particular, an ink-jet recording apparatus of the on-demand type is cheap and can be miniaturized, so that it is becoming a central technology in the full-color printer technologies which are recently being highlighted.

However, the conventional recording apparatuses of this kind have drawbacks such that the ink supply system to ink jet heads is complicated and that the ink viscosity increases due to the evaporation of volatile material in the ink at the point of the head, so that it is difficult to maintain stability of ink emission.

Various types of means have been conventionally proposed as the ink supply system and a typical means has a constitution whereby an ink tank and a head are connected by a flexible tube; the other one has a constitution such that an ink tank is mounted over a head carriage and the ink tank and the head are directly coupled. However, the former means causes a problem on durability of the tube itself since the tube is pulled in association with the movement of the head upon recording. In addition, due to the load variation in association with the movement of the tube, many drawbacks are caused: namely, (i) instability in the carriage advance, i.e., shift of a recording point; (ii) instability in the ink emission due to the variation in resistance to a flow through the tube and to the incomplete ink supply because of the mixture of air bubbles into the tube, and (iii) there are many limitations regarding the design to hold the good positional relation between the head and the ink tank, so that the optimum design of the equipment becomes difficult, etc. On the other hand, the latter means has drawbacks such that the load of the carriage motor increases since the ink tank which contains a sufficient quantity of ink for the recording is mounted over the head carriage, so that this causes the whole equipment to be enlarged in size and to be increased in cost, and that the user's hand and the equipment may become dirty because of the ink leakage and the like when an ink cartridge is exchanged. These drawbacks will be further remarkable in the apparatus of a constitution which holds a plurality of kinds of inks having different ink densities for the purpose of improvement in picture quality.

On the other hand, as means for preventing the blinding, there have been proposed capping means for preventing the dryness of the head point, means for emitting the ink from the point, and the like. These means can present the effects for this purpose. However, in the case where these operations are manually done, its operability is inferior and there is also a drawback such that if the user forgets to cap, the ink emission may become instable, and the like. In case of emitting the ink from the head point, since the residual ink in the ink tank is reduced in association with an ink quantity to be emitted, it is necessary to additionally equip particular means for sensing the ink remainder, and these means have to be provided further individually from the ink supply system; therefore, there is a drawback such that it causes the equipment to be increased in both size and cost.

Moreover, there is also a drawback such that the meniscus moves backward due to the inadequate outflow of the air at the head point when capping, or the like, so that the ink emission becomes instable.

SUMMARY OF THE INVENTION

It is a first object of the present invention to provide a liquid jet recording apparatus which can eliminate the foregoing drawbacks in the conventional apparatuses and can properly supply a recording liquid by a simple constitution, and at the same time which can recover a meniscus.

A second object of the present invention is to provide a liquid jet recording apparatus which can eliminate the foregoing drawbacks in the conventional recording apparatus of this type and can certainly supply a recording liquid by a simple constitution, and at the same time which can prevent the blinding of a jet head.

Further practically speaking, it is a specific object of the present invention to provide a liquid jet recording apparatus in which a pressure to be produced by pressure producing means is changed in dependence upon the cases where a recording liquid is supplied into a recording liquid storing chamber of a head unit and where only the meniscus recovery operation of a jet head is performed, thereby controlling a supply quantity of the recording liquid and enabling the recording liquid to be certainly supplied by a simple constitution, and at the same time the blinding of the jet head can be prevented.

A third object of the invention is to provide a liquid jet recording apparatus in which there is no additional load for the carriage motor when recording and a high carriage advance precision is presented.

Furthermore, a fourth object of the invention is to provide a liquid jet recording apparatus which can attain the above objects and whereby a degree of freedom regarding the arrangement of a main tank of the recording liquid is large, thereby making it possible to miniaturize the equipment and reduce the manufacturing cost and to improve the reliability and operability.

A fifth object of the invention is to provide a detecting apparatus which can easily detect a quantity of remaining recording liquid without equipping any particular remainder detecting mechanism.

A sixth object of the invention is to provide a detecting apparatus, particularly, in the liquid jet recording apparatus which can accomplish the fifth object and can also detect a quantity of residual recording liquid in correspondence upon a plurality of operations such as the recording liquid supplying operation for the recording head and the operation to perform only the meniscus recovery, and the like.

A seventh object of the invention is to provide a recording apparatus which can certainly execute the capping of the recording head after a predetermined time has passed and can prevent the evaporation of the recording liquid from the recording head point even if the apparatus is left as it is for a long time.

In addition, an eighth object of the invention is to provide a recording apparatus which can hold the capping apparatus in the capping position in the state in that the backward state of the meniscus when capping was recovered, thereby preventing the blinding of the recording head and an increase in viscosity of the recording liquid.

Other objects and features of the present invention will become apparent from the following detailed description with reference to the accompanying drawings.

BRIEF DESCRIPTION OF THE DRAWINGS

The drawings show a practical example of a liquid jet recording apparatus to which the invention of the present application was applied, in which

FIGS. 5A and 5B show a set of flowcharts to describe the operations of the apparatuses shown in FIGS. 1 to 4; and FIG. 6 is a diagram showing an arrangement of FIGS. 5A and 5B.

DETAILED DESCRIPTION OF THE PREFERRED EMBODIMENTS

In this specification, "recording" denotes the print of characters or/and the recording of a projection image, while a recording liquid may be simply referred to as an ink.

In addition, the end of recording denotes the end of recording for a predetermined amount of medium to be recorded; for example, in the case where the medium to be recorded is cut papers, it means the end of recording of a predetermined number of (one or a plurality of) cut papers and in the case where the medium to be recorded is a roll paper, it means the recording for a predetermined length of such paper.

A practical example of the liquid jet recording apparatus according to the present invention will be described hereinbelow in detail with reference to the drawings in accordance with the sequence of the overall constitution, the constitutions of a capping apparatus and a liquid jet head unit, the constitution of a pump, the constitution of the control system, and their actions.

[Overall constitution of the liquid jet recording apparatus (FIG. 1)]

Figure 1:
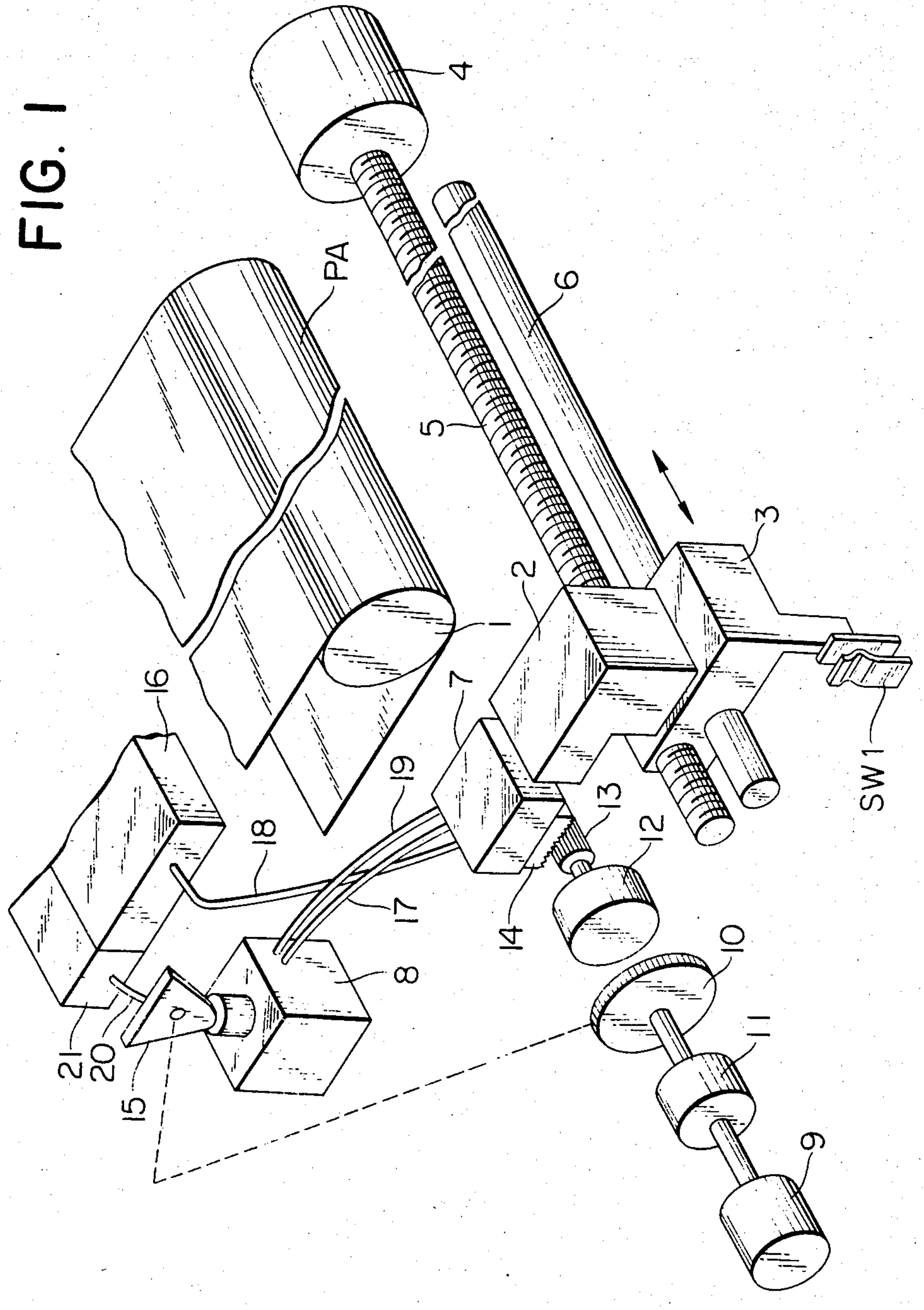
FIG. 1 is a perspective view illustrating a whole constitution of the liquid jet recording apparatus.

In FIG. 1, a reference numeral 1 denotes a platen which is rotated in association with a paper feed mechanism (not shown). A numeral 2 is a liquid jet head unit and its detail will be described later; and 3 is a carriage which is driven by a carriage motor 4 along a screw 5 and a guide 6 in the directions indicated by arrows. These control mechanisms are publicly known and since they do not relate to the essence of the invention of the present application, the detailed description is omitted.

A numeral 7 is a capping apparatus and 8 is a pump and these will be described later in detail with respect to FIGS. 2 and 3, respectively. A numeral 9 is a pulse motor for driving the pump; 10 is a gear; and 11 is an electromagnetic clutch, in which the gear 10 is interlocked with the motor 9 through the electromagnetic clutch 11 and drives a cam 15. A numeral 12 is a motor for driving the capping apparatus; 13 is a pinion; and 14 is a rock fixed to the capping apparatus 7, in which the pinion 13 is interlocked with the motor 12 and drives the capping apparatus 7 by coming into engagement with the rock 14. A numeral 16 is a recording liquid tank of a large capacity (hereinbelow, referred to as an ink tank); 17 is a suction tube for interconnecting the pump 8 with the capping apparatus 7; 18 is a supply tube for interconnecting the ink tank 16 with the capping apparatus 7; 19 is a restoration tube for draining the ink from a point (32*a* in FIG. 2) of a jet head (32 in FIG. 2); 20 is a drain tube for interconnecting the pump 8 with a drain tank 21; SW1 is a detecting switch to detect the initial position of the carriage 3; and PA is a recording paper.

[Constitutions of the capping apparatus and the liquid jet head unit (FIG. 2)]

Figure 2:
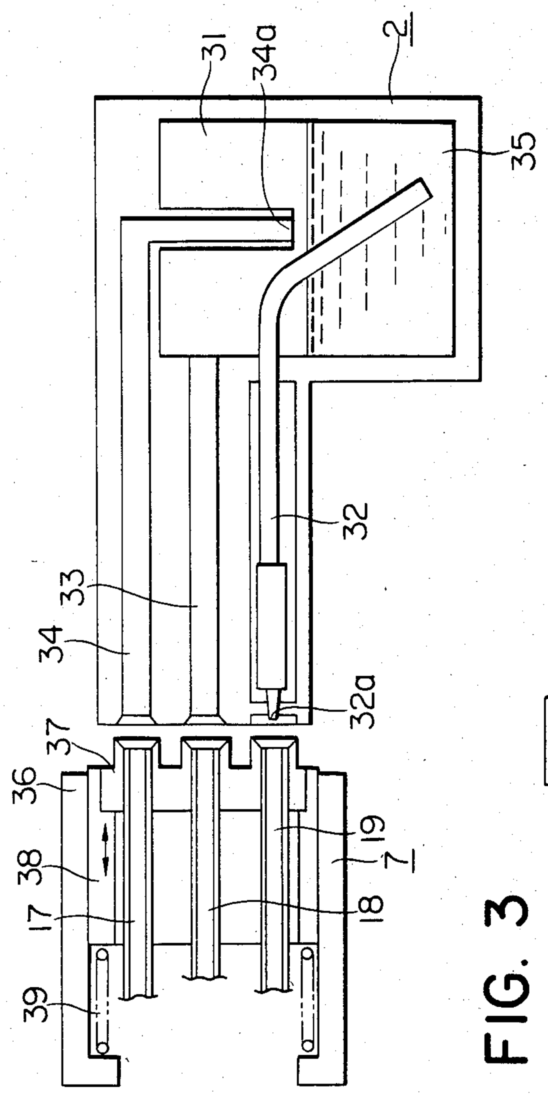
FIG. 2 is a cross sectional view showing details of a capping apparatus and a head unit in the apparatus of FIG. 1.

FIG. 2 is a cross sectional view showing the details of the capping apparatus 7 and the liquid jet head unit 2. A reference numeral 31 indicates a subtank for storing the ink necessary for the recording of a predetermined amount, for example, a predetermined number of cut papers. A predetermined amount of medium to be recorded denotes the medium to be recorded having the record amount which is determined by the size and number of papers in case of the cut papers or by the width and length in case of the roll paper. A numeral 32 is the well-known jet head; 32*a* is the point thereof; 33 an ink supply port; and 34 a suction port for controlling the pressure in the subtank 31 and draining the ink. This suction port 34 has a level pointer 34*a* and acts to keep an initial ink quantity to be supplied into the subtank 31 at a constant level. A numeral 35 indicates an ink to be stored in the subtank 31.

A numeral 36 is a main body of the capping apparatus 7 and is fixedly mounted to a main body of the recording apparatus (not shown). A numeral 37 is a cap made of material such as rubber or the like; and 38 is a movable member to which the cap 37 is fixedly mounted. This movable member 38 comes into engagement with the main body 36 by means of a guide (not shown). The rock 14 is fixedly attached to the main body 36 and is driven by the motor 12 in the directions indicated by arrows. A numeral 39 is a spring by which the movable member 38 is pushed toward the head unit 2. In addition, numerals 17, 18 and 19 in the diagram represent the suction tube, supply tube and restoration tube, respectively, similarly to FIG. 1.

[Constitution of the pump (FIG. 3)]

Figure 3:
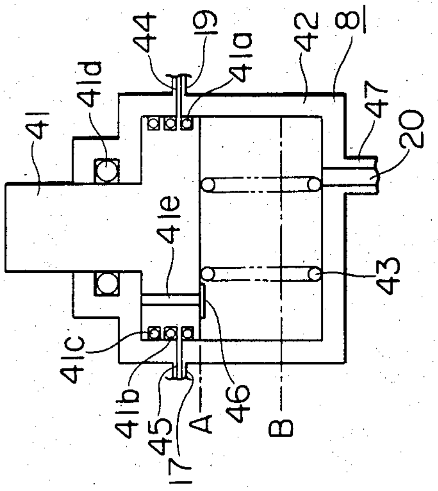
FIG. 3 is a cross sectional view showing details of a pump in the same apparatus.

FIG. 3 is a cross sectional view showing the details of the pump 8, in which a numeral 41 denotes a piston adapted to come into engagement with a cylinder 42. This piston together with O-rings 41*a*, 41*b*, 41*c*, and 41*d* serves to sealingly close this cylinder and is pushed upward by a spring 43. Numerals 44 and 45 are respectively first and second communicating holes, which have larger fluid resistances than that of a valve passage 41*e* and are arranged so as to locate in the lower portion of the piston 41. A numeral 46 is a valve made of elastic material and a portion thereof is fixed onto the piston 41; and 47 is a waste liquid discharge port.

[Constitution of the control system (FIG. 4)]

Figure 4:
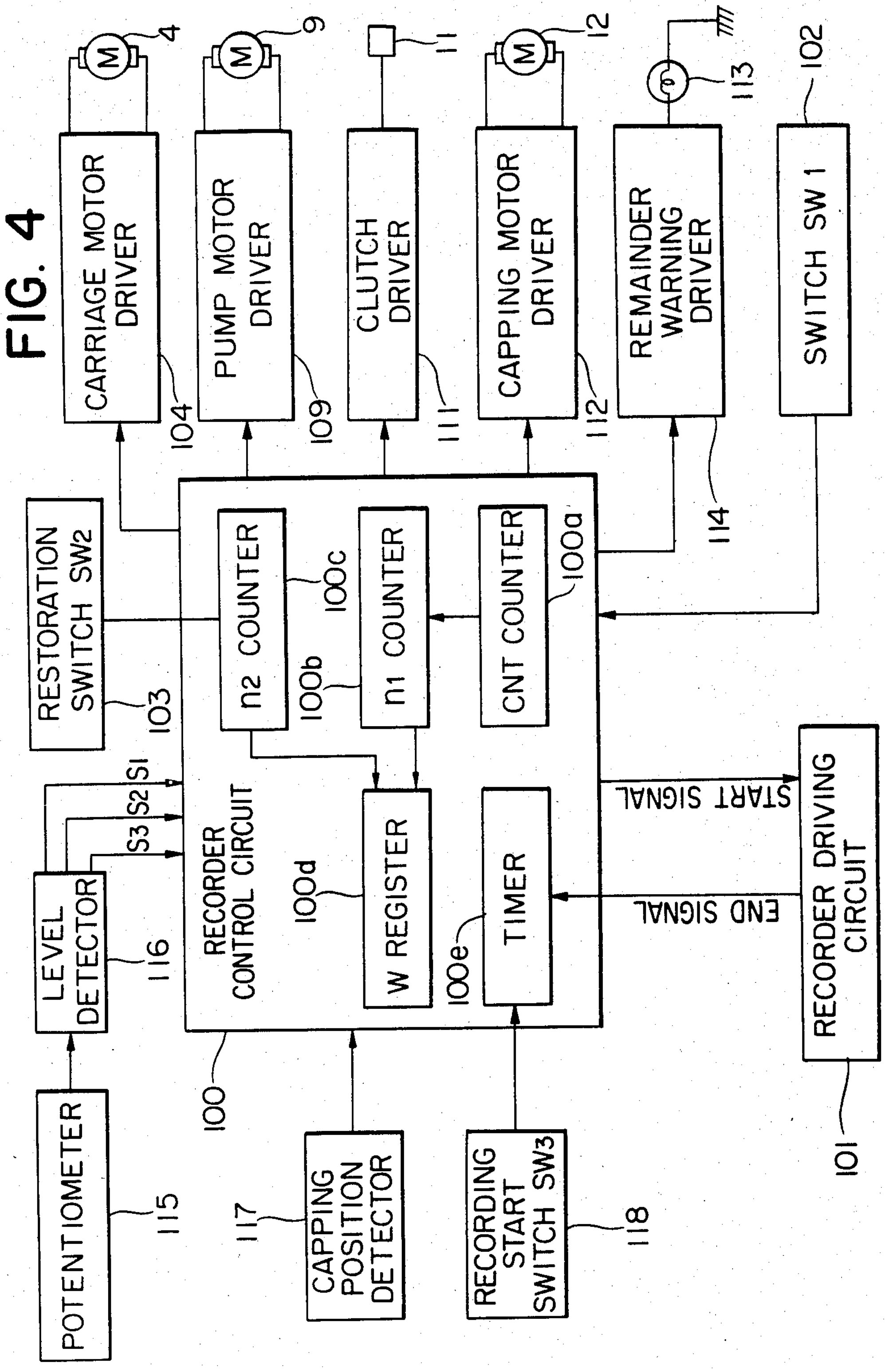
FIG. 4 shows a block diagram of the control system.

FIG. 4 shows a block diagram of the control system, in which a numeral 100 indicates a recorder control circuit which includes an ordinary digital control section and a CNT counter 100*a*, an $n_1$ counter 100*b*, an $n_2$ counter 100c, a W register 100d, and a timer 100e. The actions of the CNT counter 100a to the timer 100e will be mentioned later. A recorder driving circuit 101 transfers an end signal to the control circuit 100 in response to the end of record and receives a recording start signal from the control circuit 100. A signal outputting circuit 102 transfers a high level signal to the control circuit 100 when the initial position detecting switch SW1 of the carriage 3 operates. A signal outputting circuit 103 transfers a high level signal to the $n_2$ counter 100c and the like in the control circuit 100 when a restoration switch SW2 operates.

Numerals 104, 109, 111, and 112 are drivers for the carriage motor 4, pump driving pulse motor 9, electromagnetic clutch 11, and capping apparatus driving motor 12, respectively, and these drivers are controlled by the control circuit 100. A numeral 113 is a residual ink warning indicator of the large capacity ink tank 16 (FIG. 1); 114 is a driver for driving such an indicator; 115 is a potentiometer for detecting the location of the piston 41 (FIG. 3); and 116 is a level detector for discriminating the position of the piston 41 with respect to whether it is on the bottom dead point, intermediate point, or top dead point in response to an output level of the potentiometer 115. This level detector 116 sets a signal $S_1$ into a high level when the piston 41 is on the bottom dead point; a signal $S_2$ into a high level when it is on the intermediate point; and a signal $S_3$ into a high level when it is on the top dead point, respectively. These signals are input to the control circuit 100. A numeral 117 is a detector to detect the position of the capping apparatus 7 (FIGS. 1 and 2); and 118 is a signal outputting circuit which outputs a high level signal when a recording start switch SW3 is depressed and an output signal of this circuit is transferred to the timer 100e and the like. In the above constitution, an indicating device to indicate the remainder itself may be also equipped in place of the residual ink warning indicator 113.

[Actions of a practical example of the liquid jet recording apparatus according to the present invention (FIGS. 1 to 5)]

Figure 5A:
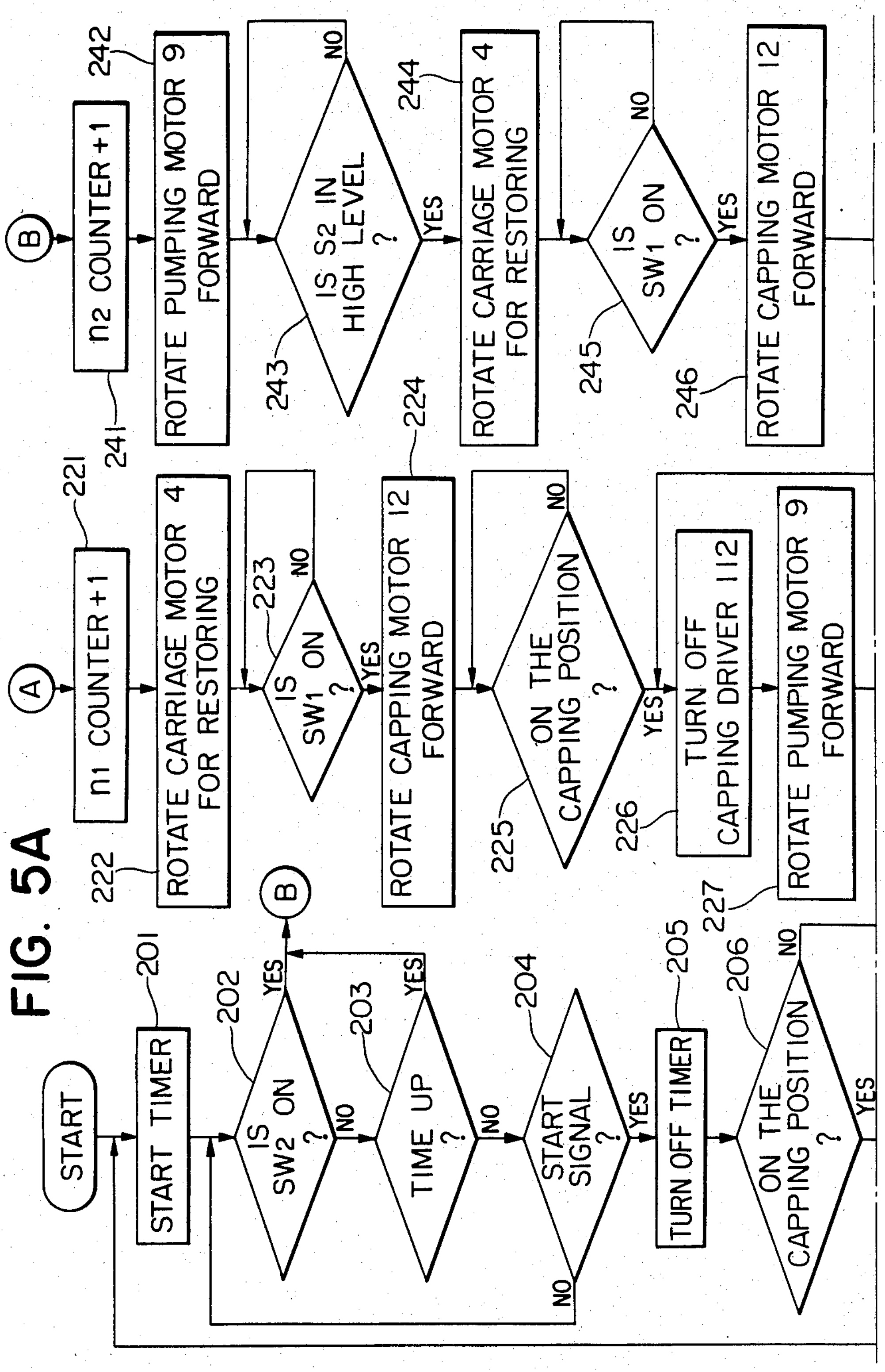

The actions of the apparatuses shown in FIGS. 1–4 will be then described with reference to flowcharts of FIG. 5 also.

(1) Recording liquid supply and meniscus recovery operations

When the recording of a predetermined number of papers is ended, the CNT counter 100a outputs a signal indicative of the end of recording and at the same time the counter 100a itself is reset [step 212 in FIG. 5(B); hereinbelow, the indication of the drawing numbers are omitted and only the step numbers are simply indicated]. The nl counter 100b counts up by "1" in response to this signal and the carriage motor driver 104 also drives the carriage motor 4, thereby returning the carriage 3 to its initial position (steps 221 and 222). The recovery of the carriage 3 is confirmed by the initial position detecting switch SW1 and the capping motor driver 112 drives the capping apparatus driving motor 12 in response to a high level output of the signal outputting circuit 102. Thus, the movable member 38 of the capping apparatus 7 is moved to the point of the head unit 2 due to the engagement between the pinion 13 and the rock 14. In association with the movement of the movable member 38, the suction tube 17 engages the suction port 34; the supply tube 18 engages the ink supply port 33; and the restoration tube 19 engages the point 32a of the liquid jet head, respectively. In this state, when it is detected that the capping apparatus is on the capping position by the operation of the capping position detector 117, the capping motor driver 112 is turned off. Even when the capping motor driver 112 is turned off, the cap 37 is pushed toward the point of the head unit 2 by means of the spring 39, so that the above-mentioned engagements will not be released (steps 223 to 226).

Next, the pump motor driver 109 and clutch driver 111 are made operative, thereby driving the pump driving pulse motor 9 and electromagnetic clutch 11 and allowing the gear 10, accordingly, the cam 15 to be rotated (step 227). The piston 41 in the pump 8 starts descending due to the rotation of the cam 15, so that the upper chamber in the pump 8 becomes a negative pressure. This negative pressure becomes maximum when the piston 41 reaches the bottom dead point.

In this process, the pressure in the subtank 31 becomes a negative pressure through the suction port 34, due to this, the ink is supplied from the ink tank 16 to the subtank 31 through the supply port 33 and supply tube 18. At the same time, the ink is absorbed from the point 32a of the jet head through the restoration tube 19, thereby allowing the meniscus of the head to be recovered.

The pressure in the upper chamber in the pump 8 is recovered by these air and ink absorbed and the pressure in the subtank 31 is also recovered since the ink is supplied. The level pointer 34a has been preset in the manner such that when the ink level reaches the same pointer, a predetermined pressure is recovered. On the other hand, even if the additional ink remains in the subtank 31 and exceeds the level pointer 34a in dependence upon the recording state, it will be drained as the extra ink into the pump 8 through the suction port 34 and suction tube 17. Thus, the air over a constant quantity is certainly held in the subtank 31 and by setting the level pointer 34a into a position lower than the head point 32a, the printing is not performed under the high pressure condition; in addition, it is also possible to suppress the variation in pressure in association with the movement of the head unit 2 owing to the damper effect of the air. Furthermore, a good recording can be performed since the meniscus at the head point 32a has been recovered.

On the other hand, the air and discharge ink from the head unit 2 are transferred into the upper chamber in the pump 8 through the suction tube 17 and second communicating hole 45. The valve 46 is closed due to an increase in pressure in the lower chamber in the pump 8 while the piston 41 is descending, so that the ink and the like remaining in the lower chamber, which were drained at the last time, are discharged into the drain tank 21 through the discharge port 47 and drain tube 20. When the piston 41 reaches the bottom dead point, the signal $S_1$ becomes a high level. The pump motor driver 109 and clutch driver 111 are turned off in response to this high level signal, then the motor 9 is stopped. The piston 41 keeps its position due to the holding force of a worm gear (not shown). (Steps 228 and 229).

The above operations are ended during this holding interval and the pressure in the upper chamber is recovered. After is was confirmed that a predetermined time necessary for these operations has passed, the motor 9 is rotated backward, thereby elevating the piston 41 (steps 230 and 231). At this time, since the valve 46 is opened, the air and drain ink in the upper chamber are sent into the lower chamber, but the reverse current to the head unit 2 will not be caused since the fluid resistances of the communicating holes 44 and 45 are higher than that of the valve passage 41*e*. When the piston 41 reaches the top dead point, it is held by the spring 43. Next, the capping motor driver 112 is made operative again and the capping apparatus driving motor 12 is reversely rotated, so that the movable member 38 is returned to the initial position. Consequently, the capping of the head unit 2 is released and the recording apparatus enters the recordable mode. In this way, a series of operations are completed (step 232, Ⓒ, . . . , Ⓓ, . . . , steps 204 to 208).

That is, even if the pump 8 is recovered after the meniscus was recovered, the capping apparatus 7 is held into the capping state for the head unit 2; therefore, the blinding of the jet head 32 and an increase in viscosity of the ink are prevented, so that a good recording can be always performed.

According to the foregoing liquid jet recording apparatus, the ink tank 16 of a large capacity and the subtank 31 of a small capacity in the head unit 2 are provided. The ink is supplied from the ink tank 16 into the subtank 31 by the pump 8 serving as single pressure producing means. The ink is discharged from the point 32*a* of the jet head 32 and the meniscus is recovered. Therefore, the ink can be accurately supplied by a simple constitution and the meniscus recovery is also simultaneously performed, so that the recording can be stably executed. Furthermore, the ink supply and the meniscus recovery are simultaneously carried out by single pressure producing means, so that this enables the equipment to be miniaturized and the manufacturing cost to be reduced.

Moreover, in the foregoing recording apparatus, the single capping apparatus 7 is provided with the ink supply system (supply tube 18) and the ink suction system (restoration tube 19) for recovering the meniscus. These systems come into engagement with the ink supply port 33 and jet head 32 in the head unit 2 in association with the movement of the capping apparatus 7, respectively, and they also disengage. Therefore, the fluid passage for the ink supply and meniscus recovery can be constituted by a simple mechanism with the aids of the above-described two types of constitutions. It is also possible to surely perform the foregoing various operations, thereby enabling reliability tô be improved. Furthermore, since the carriage motor 4 does not have any additional load such as the ink supply tube and the like during the recording operation, this contributes reduction in inertial force, improvement in accuracy of the carriage advance, miniaturization of the motor, and the like. As a result of this, the equipment can be miniaturized and the manufacturing cost can be reduced. In addition, the operability can be further improved since a degree of freedom regarding the arrangement of the ink tank 16 increases.

In the foregoing apparatus, the recording liquid is supplied and the meniscus is recovered by the pump 8 serving as the single pressure producing means and this arrangement is desirable in consideration of the miniaturization of the apparatus and the reduction of manufacturing cost; however, the present invention can be also implemented by a plurality of pressure producing means.

Furthermore, since the foregoing recording apparatus is constituted in such a manner that the ink is automatically supplied into the subtank 31 after a predetermined number of papers have been recorded, even if the ink tank is divided into the main tank 16 of a large capacity and the subtank 31 of a small capacity, the ink can be accurately supplied. Thus, it is possible to accomplish the effects of miniaturization of the equipment, improvement in operability, etc. as mentioned before.

(2) Operation only for the meniscus recovery

In response to the operation of the restoration switch SW2, the signal outputting circuit 103 transfers a high level signal to the $n_2$ counter 100*c*, so that this counter counts up by "1". Subsequently, the pump motor driver 109 is made operative and the pump driving pulse motor 9 is driven, thereby allowing the position of the bottom surface of the piston 41 to be moved from the position indicated by A in FIG. 3 to the position of B. This movement of the piston 41 is confirmed by the signal $S_2$ at a high level. Then, the carriage motor driver 104 is made operative and the carriage motor 4 is driven, thereby permitting the carriage 3 to be returned. After confirming the recovery of the carriage 3 based on the operation of the switch SW1, the capping motor driver 112 is made operative to allow the capping apparatus driving motor 12 to be forwardly rotated, thereby making the capping apparatus 7 come into engagement with the head unit 2 (steps 241–246). After it has been confirmed that the capping apparatus 7 is on the capping position (step 247), the operations after step 226 in FIG. 5 are executed. However, in this case, since the bottom surface of the piston 41 has already descended to the position of B in FIG. 3, different from the foregoing case of ink supply, the supply of ink to the subtank 31 is restricted and the meniscus recovery operation is performed since the negative pressure in the upper chamber in the pump 8 is small.

In this case also, even when the pump 8 is recovered after the meniscus was recovered, the capping apparatus 7 is held to the capping state.

In the foregoing liquid jet recording apparatus, two steps of pressures are produced by adjusting the position of the piston 41 in the pump 8 serving as the pressure producing means, and a quantity of the ink to be supplied from the ink tank 16 to the subtank 31 is controlled. Therefore, by changing over the pressure to be produced in dependence upon the ink supply operation and the operation only to recover the meniscus, the substantial portions of the mechanisms for both operations can be commonly used and thereby enabling both operations to be certainly executed. Consequently, it is possible to avoid complication of the mechanisms for the ink supply and meniscus recovery and deterioration in operability in the conventional recording apparatus.

(3) Automatic capping operation

Upon completion of the recording of a sheet of paper, the timer 100*e* starts operating in response to the end signal from the recorder driving circuit 101 (steps 210 to 212, Ⓒ, Ⓓ, step 201). Although the start of operation of the timer 100*e* was set whenever the recording of a sheet of recording paper is ended in this example, the timer 100*e* may be also made operative whenever the recording of the medium to be recorded of an arbitrary number of papers is ended, further generally speaking, of a predetermined amount as mentioned previously.

The timer 100*e* may be reset at any time, for example, when the recording start signal is input from the signal outputting circuit 118, when the actual recording is started, when the operation of the timer 100*e* is completed, or after its completion.

The timer 100*e* is reset in response to a signal to be output from the signal outputting circuit 118 due to the operation of the recording start switch SW3. Therefore, when the recording of the information to be recorded is started within the set time of the timer 100*e*, the ordinary recording is performed without executing the capping operation. On the other hand, unless the recording is started within the set time, the operation only for the meniscus recovery is carried out (steps 201–205, Ⓑ). Although the pump 8 is recovered after the meniscus was recovered (step 231), the capping apparatus 7 is not retracted at this time. But, it is retracted only in response to the operation of the recording start switch SW3 (steps 204–208).

Due to this, since the cap of the point 32*a* of the jet head 32 is released for the first time only when the recording is started, its dryness is prevented. This point is similar to the foregoing other operation.

According to the foregoing apparatus, the capping apparatus 7 is made operative after the operation of the timer 100*e* in the case where the recording is not restarted during the operation of the timer 100*e*, so that the capping of the head can be surely performed after a predetermined time passed. Therefore, even if the apparatus is left as it is for a long time, it is possible to prevent the evaporation of the ink from the jet head point and a good recording can be always done.

(4) Ink remainder detecting operation

In the foregoing recording apparatus, a supply quantity $w_1$ when the ink is supplied once and an ink supply quantity $w_2$ in the meniscus recovery operation are always constant, and the initial capacity W in the ink tank 16 is also constant. Therefore, the following relation is satisfied.

$$W' = W - (n_1 w_1 + n_2 w_2) \quad (1)$$

where, $n_1$: the number of times of ink supply operations, $n_2$: the number of times of only meniscus recovery operations, and W': a quantity of residual ink.

In this way, a quantity of remaining ink can be obtained from the result of the calculation of expression (1) by substituting count values of the $n_1$ counter 100*b* and $n_2$ counter 100*c* in expression (1).

Practically speaking, the memory content of the W register 100*d* is updated so that $$W = W_1 - (n_1 w_1 + n_2 w_2)$$

whenever the $n_1$ counter 100*b* or $n_2$ counter 100*c* counts up for the preceding count value $W_1$. This value is compared with a reference value V and if $W < V$, the remainder warning driver 114 will be made operative, thereby allowing the remainder warning indicator 113 to perform the warning indication. As described before, an indicating apparatus for indicating the remainder itself may be used in place of the warning indicator 113. When the warning is indicated, the ink is supplemented into the ink tank 16 and the W register 100*d* is reset (steps 251–255).

With such a constitution, it is possible to easily check the necessity of ink supplement into the ink tank 16, so that the incomplete recording due to lack of ink can be prevented. In addition, no particular apparatus is needed to detect the ink remainder. Therefore, even in an apparatus which uses many kinds of and a great quantity of inks, such as a multi-color recording apparatus, the ink remainder can be easily detected, thereby enabling the equipment to be miniaturized and operability to be improved, and the like.

In the apparatus shown in FIGS. 1 to 4, the pump 8 serving as the pressure producing means produces two levels of pressures and a quantity of ink to be supplied from the ink tank 16 to the subtank 31 is controlled depending upon this pressure produced; however, three or more levels of pressures may be produced and a plurality of pressure producing means may be also provided.

On the other hand, the above-described practical example is applied to the liquid jet recording apparatus in which a droplet of the recording liquid is emitted from the point of the jet head due to the contracting motion of the piezoelectric transducer or by applying the thermal pulse. However, in case of applying the invention to a recording apparatus which uses a recording liquid having high viscosity, e.g., an oily recording liquid, it is also possible to utilize a rotary pump, propeller pump, jet pump, or the like as the pump.

As described above, a feature of the apparatus of this embodiment is that it comprises: a first recording liquid storing chamber of a large capacity (for example, the large capacity ink tank 16 in FIG. 1 in the foregoing practical example); a second recording liquid storing chamber of a small capacity (the subtank 31 in FIG. 2, as well); a pressure producing device (the pump 8 in FIG. 3, as well); and devices for supplying the recording liquid from the first recording liquid storing chamber to the second recording liquid storing chamber in operation of the pressure producing device and for emitting the recording liquid from the point of the jet head (the suction tube 17, supply tube 18 and restoration tube 19 in FIG. 1, as well).

Therefore, it is possible to supply the recording liquid and recover the meniscus by a simple mechanism, and the substantial portions of the supply system of the recording liquid and the means for preventing the blinding of the jet head can be commonly used, so that this largely contributes to miniaturization of the equipment and improvement in operability.

In addition, another feature of the apparatus of this embodiment is that it comprises: a first recording liquid storing chamber of a large capacity (for example, the large capacity ink tank 16 in FIG. 1 in the foregoing embodiment; a second recording liquid storing chamber of a small capacity (the subtank 31 in FIG. 2, as well); and a pressure producing device for producing at least two levels of pressures (the pump 8 which changes the pressure for the head unit 2 in dependence upon the position of the piston 41 in FIG. 3, as well), in which a quantity of recording liquid to be supplied from the first recording liquid storing chamber to the second recording liquid storing chamber is controlled due to this pressure produced.

Consequently, by changing over the pressure to be produced in dependence upon the recording liquid supply operation and the operation only to recover the meniscus, for example, the relevant portions of the mechanisms for both operations can be commonly used, thereby enabling both operations to be surely performed. Thus, various operations necessary for the liquid jet recording can be certainly executed by a simple constitution and its reliability and operability can be improved and the manufacturing cost can be also reduced as compared with the conventional apparatus which needs individual mechanisms for both supplying the recording liquid and recovering the meniscus and which leads to increase in size of the equipment and decrease in reliability and operability.

In addition, still another feature of the apparatus of this embodiment is that it comprises: a first recording liquid storing chamber of a large capacity (e.g., the ink tank 16 in FIG. 1 in the practical example mentioned before); a second recording liquid storing chamber of a small capacity (the subtank 31 in FIG. 2, as well) provided in the liquid jet head unit; a capping apparatus (the capping apparatus 7 in FIG. 2, as well) for the liquid jet head unit; a device for supplying the recording liquid from the 1st recording liquid storing chamber to the 2nd recording liquid storing chamber and a device for recovering the meniscus at the jet head (the supply tube 18 and restoration tube 19 in FIG. 2, as well), these devices being attachably and detachably mounted to the liquid jet head unit through the capping apparatus; and a device for separating the capping apparatus from the liquid jet head unit when recording (the device for retracting the capping apparatus 7 in response to the output of the recording start signal outputting circuit 118 in FIG. 4, as well).

As a consequence, the recording liquid can be supplied to the jet head and the meniscus at the jet head can be recovered by a simple mechanism. In addition, since the carriage motor doesn't have any additional load when recording, a degree of accuracy in carriage advance can be raised and since a degree of freedom in arrangement of the first large capacity recording liquid storing chamber is large also, these advantages largely contribute to miniaturization of the equipment, reduction in manufacturing cost, and improvement in reliability and operability.

Furthermore, a further another feature of the apparatus of this embodiment is that it comprises: a recording liquid storing chamber of a large capacity (for instance, the ink tank 16 in FIG. 1 in the practical example mentioned before); a recording liquid storing chamber of a small capacity to store the recording liquid of a quantity necessary for the recording of at least a predetermined amount of medium to be recorded (the subtank 31 in FIG. 2, as well); a pressure producing device (the pump 8 in FIG. 3, as well); devices for supplying the recording liquid from the large capacity recording liquid storing chamber to the small capacity recording liquid storing chamber in operation of the pressure producing device (the suction tube 17 and supply tube 18 in FIGS. 1 and 2, as well); and a device for detecting a quantity of residual recording liquid in the large capacity recording liquid storing chamber by integrating, that is, accumulating or counting the number of times of the operations of the pressure producing device (the recorder control circuit 100 for accumulating a count value of the $n_1$ counter *100b* or count values of the $n_1$ counter *100b* and $n_2$ counter *100c* in FIG. 4, as well).

Thus, a quantity of remaining recording liquid can be easily detected without providing a particular remainder detecting mechanism.

Furthermore, in addition to the foregoing features, the apparatus of this embodiment has features such that the pressure producing device produces at least two levels of pressures (the pump 8 in FIG. 3 produces at least two levels of pressures in dependence upon the position of the piston 41, as well), and that the detecting device integrates the number of times of the operations of the pressure producing device by adding a weight coefficient in accordance with the pressure thus produced (integrates by adding weight coefficients based on the supply quantity $w_1$ when the recording liquid is supplied and on the supply quantity $w_2$ when the operation only to recover the meniscus is performed, as well).

As a result, a quantity of remaining recording liquid can be detected in response to a plurality of operations such as the recording liquid supply operation for the recording head, operation only for the meniscus recovery, etc.

Furthermore, according to the present invention, there are provided a timer which operates for a constant time in response to the end of recording and a device for allowing the capping apparatus to be made operative after the operation of this timer when the recording is not restarted during the operation of this timer. Therefore, the capping of the recording head can be certainly performed after a predetermined time passed and even if the apparatus is left as it is for a long time, it is possible to prevent the evaporation of the recording liquid from the point of the recording head.

In addition, since there is provided a device for holding the capping apparatus on the capping position in the state whereby the meniscus has been recovered, it is possible to prevent the blinding of the recording head and increase in viscosity due to the evaporation of the recording liquid.

According to the invention of this application, a good recording can be always performed due to these advantages and it is also possible to reduce the burden for the operator and to improve reliability and operability of the recording apparatus.

In addition, the cited practical example described above does not restrict the scope of the invention of the present application. Various changes and modifications of the embodiment of the invention are possible within the scope of the appended claims without departing from the spirit of the invention.

What is claimed is:

1. A liquid jet recording apparatus comprising:

- a jet head for emitting a recording liquid;
- a first recording liquid storing chamber of a large capacity;
- a second recording liquid storing chamber of a small capacity said jet head communicating with said second chamber and said first chamber being isolated from said second chamber;
- pressure producing means; and
- supplying and didshcarging means, connected with said first chamber and selectively coupled to said second chamber and to said jet head, for supplying said recording liquid from said first recording liquid storing chamber to said second recording liquid storing chamber and discharging the recording liquid from said jet head in operation of said pressure producing means.

2. A recording apparatus according to claim 1, wherein said second recording liquid storing chamber stores the recording liquid necessary for the recording of at least a sheet of recording paper.

3. A recording apparatus according to claim 1, further comprising means for maintaining a quantity of recording liquid in said second recording liquid storing chamber constant due to the pressure to be produced.

4. A recording apparatus according to claim 1, wherein said second recording liquid storing chamber and said jet head are integrally constituted.

5. A recording apparatus according to claim 1, wherein said jet head has an electrical-mechanical transducing element.

6. A liquid jet recording apparatus comprising:

a jet head for emitting a recording liquid;

a first recording liquid storing chamber of a large capacity;

a second recording liquid storing chamber of a small capacity;

pressure producing means for producing at least two levels of pressure, wherein said pressure producing means produces a first pressure necessary to discharge the recording liquid from said jet head and a second pressure higher than said first pressure and which is necessary to supply the recording liquid from said first recording liquid storing chamber to said second recording liquid storing chamber;

selecting means for selecting one of said first and second pressures; and means for driving said pressure producing means in accordance with the selection of said selecting means.

7. A recording apparatus according to claim 6, further comprising means for maintaining a quantity of recording liquid in said second recording liquid storing chamber constant due to the pressure to be produced.

8. A recording apparatus according to claim 6, wherein said second recording liquid storing chamber stores the recording liquid necessary for the recording of at least a sheet of recording paper.

9. A recording apparatus according to claim 6, wherein said second recording liquid storing chamber and said jet head are integrally constituted.

10. A recording apparatus according to claim 6, wherein said jet head has an electrical-mechanical transducing element.

11. A liquid jet recording apparatus comprising:

a first recording liquid storing chamber of a large capacity;

a liquid jet head unit including a jet head for emitting a recording liquid and a second recording liquid storing chamber of a small capacity provided to supply the recording liquid to said jet head, said liquid jet head communicating with said second chamber while said second chamber is isolated from said first chamber;

a capping apparatus for said liquid jet head unit, said capping apparatus communicating with said first chamber;

means for supplying the recording liquid from said first recording liquid storing chamber to said second recording liquid storing chamber and for recovering a meniscus at said jet head, said supply and recovery means being connected with said capping apparatus and selectively coupled to said liquid jet head unit through said capping apparatus; and separating means for separating said capping apparatus from said liquid jet head unit when recording.

12. A recording apparatus according to claim 11, wherein said second recording liquid storing chamber stores the recording liquid necessary for the recording of at least a sheet of recording paper.

13. A recording apparatus according to claim 11, wherein said jet head has an electrical-mechanical transducing element.

14. A recording apparatus according to claim 11, wherein said supply and recovery means includes pressure producing means for producing a negative pressure to introduce the liquid to said second chamber from said first chamber and to recover the meniscus at said head.

15. A recording apparatus according to claim 14, further comprising means for maintaining a quantity of recording liquid in said second recording liquid storing chamber constant due to the pressure to be produced.

16. A liquid jet recording apparatus comprising:

a jet head for emitting a recording liquid;

a recording liquid storing chamber of a large capacity;

a recording liquid storing chamber of a small capacity for storing the recording liquid of a quantity necessary for recording on a medium for at least a predetermined amount;

pressure producing means;

means for supplying a predetermined quantity of the recording liquid from said large capacity recording liquid storing chamber to said small capacity recording liquid storing chamber in each operation of said pressure producing means; and detecting means for detecting a quantity of residual recording liquid in said large capacity recording liquid storing chamber by accumulating the number of times of the operations of said pressure producing means.

17. A recording apparatus according to claim 16, wherein said detecting means further has generating means for generating a warning in response to a detection output when it detects that the quantity of residual recording liquid in said large capacity storing chamber becomes a predetermined value or less.

18. A recording apparatus according to claim 16, wherein said small capacity recording liquid storing chamber stores the recording liquid necessary for the recording of at least a sheet of recording paper.

19. A recording apparatus according to claim 16, further comprising means for maintaining a quantity of recording liquid in said small capacity recording liquid storing chamber constant due to the pressure to be produced.

20. A recording apparatus according to claim 16, wherein said small capacity recording liquid storing chamber and said jet head are integrally constituted.

21. A recording apparatus according to claim 16, wherein said jet head has an electrical-mechanical transducing element.

22. A liquid jet recording apparatus comprising:

a liquid jet recording head;

a capping apparatus for said head;

a timer for counting a predetermined period of time;

trigger means for triggering said timer at the end of recording; and means for operating said capping apparatus when said timer has counted said period of time while the recording is not restarted during the period of time.

23. An ink jet recording apparatus using an ink, comprising:

a first ink tank;

an ink jet head having an ink emitting orifice;

a second ink tank communicated with said head;

communicating means for communicating said second ink tank with said first ink tank;

suction means for sucking ink, said suction means having a first operating mode for generating a first negative pressure to recover said ink jet head from an unstable ink emitting state and a second operating mode for generating a second negative pressure to supply ink to said second ink tank from said first ink tank, said second negative pressure being dufferent from said first negative pressure;

selecting means for selecting one of said first and second operating modes; and means for driving said suction means in accordance with the operating mode selected by said selecting means.

24. An apparatus according to claim 23, wherein said first negative pressure is weaker than said second negative pressure.

* * * * *